United States Patent
Gao et al.

(10) Patent No.: US 12,072,321 B2
(45) Date of Patent: Aug. 27, 2024

(54) CHROMATOGRAPHIC APPARATUS FOR ONLINE ENRICHMENT OF TRACE AND ULTRA-TRACE COMPONENTS AND METHOD FOR ANALYZING TRACE AND ULTRA-TRACE COMPONENTS USING SAME

(71) Applicant: Asicotech (SHANGHAI) Company Limited, Shanghai (CN)

(72) Inventors: Zhirong Gao, Shanghai (CN); Yanjun Zhang, Shanghai (CN)

(73) Assignee: Asicotech Company Limited, Shanghai (CN)

( * ) Notice: Subject to any disclaimer, the term of this patent is extended or adjusted under 35 U.S.C. 154(b) by 566 days.

(21) Appl. No.: 17/366,616

(22) Filed: Jul. 2, 2021

(65) Prior Publication Data

US 2021/0364483 A1   Nov. 25, 2021

(51) Int. Cl.
| | |
|---|---|
| *G01N 30/08* | (2006.01) |
| *G01N 30/12* | (2006.01) |
| *G01N 30/20* | (2006.01) |
| *G01N 30/30* | (2006.01) |
| *G01N 30/40* | (2006.01) |

(52) U.S. Cl.
CPC ............ *G01N 30/08* (2013.01); *G01N 30/12* (2013.01); *G01N 30/20* (2013.01); *G01N 30/30* (2013.01); *G01N 30/40* (2013.01); *G01N 2030/201* (2013.01)

(58) Field of Classification Search
CPC ........ G01N 30/08; G01N 30/12; G01N 30/20; G01N 30/30; G01N 30/40
See application file for complete search history.

(56) References Cited

U.S. PATENT DOCUMENTS

| | | | |
|---|---|---|---|
| 2002/0146349 A1* | 10/2002 | Gygi | G01N 30/16 |
| | | | 422/68.1 |
| 2016/0146765 A1 | 5/2016 | Ovadia et al. | |
| 2019/0118171 A1* | 4/2019 | Cardin | G01N 30/461 |
| 2020/0400622 A1* | 12/2020 | Chen | G01N 30/12 |

FOREIGN PATENT DOCUMENTS

| | | |
|---|---|---|
| CN | 203870078 U | 10/2014 |
| CN | 105651910 A | 6/2016 |
| CN | 207263702 U | 4/2018 |
| CN | 108387668 A | 8/2018 |

* cited by examiner

*Primary Examiner* — Jamel E Williams
*Assistant Examiner* — Alex T Devito

(57) ABSTRACT

A chromatographic apparatus for online enrichment of trace and ultra-trace components and an analytical method using the same. The apparatus includes an injection system, a vaporizing chamber, an enrichment system, a thermal box, a sample collection system, a focusing trap, a chromatographic analytical column system, a detector and an electronic control system. The method includes steps of sample enrichment, thermal desorption and back flushing, which are performed through a combination of a four-way valve and an electronic switch valve box.

14 Claims, 4 Drawing Sheets

CHROMATOGRAPHIC APPARATUS FOR ONLINE ENRICHMENT OF TRACE AND ULTRA-TRACE COMPONENTS AND METHOD FOR ANALYZING TRACE AND ULTRA-TRACE COMPONENTS USING SAME

TECHNICAL FIELD

This application relates to chemical analysis, and more particularly to a chromatographic apparatus for online enrichment of trace and ultra-trace components and a method for analyzing the trace and ultra-trace components using the same.

BACKGROUND

Considering the fact that it is difficult to achieve the analysis of trace and ultra-trace impurities only using a detector with high detection sensitivity and low detection limit, it is required to enrich such trace components prior to analysis. Currently, the solid-phase extraction technique, consisting of processes of enrichment, desorption and analysis, is considered as a powerful tool for the enrichment and analysis of gaseous, liquid and solid micro or trace impurities in the fields of environmental and petrochemical analysis. Impressively, this technique enables both the offline analysis and the online analysis of the trace components. However, the enrichment material and enrichment tube employed in the above method are often not readily available since they need to have a certain adsorption capacity and easy desorption without introduction of new impurities and irreversible adsorption. Additionally, numerous enrichment materials are required to be used together for complex matrices and mixtures, which will make it difficult to ensure a desired recovery for all components. At the same time, undue experimentation is required to determine conditions of thermal desorption and elution to obtain a reliable method, which is time- and labor-consuming.

Chinese patent No. 2038700780 discloses a gas chromatography system, in which an adsorption and desorption apparatus, a sampling pump and a micro chromatograph are connected through a six-way valve to realize the online analysis of gas samples. This system not only has fast response and good portability, but also can operate independently, and thus it is suitable for the handling of emergencies. However, in use, the sample is directly delivered to the adsorption and desorption apparatus (a key role in the enrichment of target components), so that the background interference cannot be eliminated. In addition, there are high requirements for adsorbent materials, optimization of conditions and temperature of the cold trap.

Chinese patent No. 207263702U first couples the online solid-phase extraction technique widely used in liquid chromatography (LC) to gas chromatography (GC) to design an online solid-phase extraction apparatus for gas chromatography, in which a solid-phase extraction trap is provided to enrich, focus and re-release the components separated by one-dimensional chromatography into a two-dimensional chromatographic column for separation and detection, allowing for good selectivity and high detection sensitivity for low-level compounds. Although the apparatus eliminates the background interference by using a one-dimensional chromatographic column, the trapping of different components is still greatly dependent on the selected filler due to the use of a solid-phase extraction trap. In addition, the apparatus has a high requirement for cooling.

For the analysis of a complex sample such as volatile organic compounds (VOCs) in atmosphere or water, the target components are prone to being interfered by adsorption materials, sample delivery and background factor. At the same time, the thermal expansion and contraction of the adsorbent materials during the repeated heating process will bring a poor reproducibility in the space between the adsorbent particles in the adsorbent tube. As a result, the analysis repeatability and reproducibility will not be satisfactory, rendering the results less reliable. In the analysis of a sample such as high-purity gas, high-purity solvent and polymer-grade monomer, when the background is air or purge carrier gas, since the adsorption performance of the background components is similar or close to that of the impurity components, the similar systems will fail to enable an effective detection.

Given the above, this disclosure directly uses a commercial/home-made gas chromatographic column/tube as a system for enriching impurities, which eliminates the sample background interference on the enrichment and analysis of the target components. With regard to the enrichment, desorption and analysis conditions, reference can be made to the use conditions of the corresponding chromatographic column without doing undue experimentation. The chromatographic column can be used repeatedly after back flushing, allowing for lowered cost. Moreover, the apparatus provided herein combines the direct injection with chromatographic column-based enrichment, which effectively avoids the loss of trace components caused by the strong and irreversible adsorption on the pretreatment system and cold trap. The apparatus has an ingenious design, which simplifies the installation and connection of the chromatographic column. The sampling system is optional, which enhances the compatibility of the apparatus to make it suitable for the analysis of trace and ultra-trace impurities in gaseous, liquid and solid high-purity samples that can be analyzed by gas chromatography. Currently, there is still no report about the online chromatographic enrichment apparatus and analytical method of trace and ultra-trace components.

SUMMARY

An object of this application is to provide a chromatographic apparatus for online enrichment of trace and ultra-trace components and a method for analyzing the trace and ultra-trace components using the same to overcome the defects in the thermal desorption applied in the existing analysis of the composition of trace and ultra-trace impurities in high-purity gaseous, liquid and solid samples, for example, the enrichment apparatus is complicated; there is great difficulty in seeking a selective adsorption material; the steps of extraction and desorption (thermal desorption/elution) have harsh conditions and low efficiency; the background interference cannot be eliminated; and the detection has a narrow linear range and a poor stability and repeatability.

Technical solutions of this application are specifically described as follows.

In a first aspect, this application provides a chromatographic apparatus for online enrichment of trace and ultra-trace components and a method for analyzing the trace and ultra-trace components using the same, comprising:
an injection system;
a column compartment;
a vaporizing chamber;
a chromatographic analytical column system;
a detector;

an electronic pressure controller;
an enrichment system;
a focusing trap;
a thermal box;
a sample collection system;
a four-way valve; and
an electronic control system;
wherein the injection system is connected to the column compartment; the vaporizing chamber, the chromatographic analytical column system and the detector are connected to the column compartment; and the chromatographic analytical column system is connected to the detector;
the injection system is connected to the vaporizing chamber through the column compartment; the injection system is configured to inject a sample into the vaporizing chamber for vaporization; the enrichment system is connected to the vaporizing chamber through the column compartment and is also connected to the focusing trap; the enrichment system is configured to trap target components in a vaporized sample, and desorb and transfer the target components to the focusing trap; the four-way valve is provided in the thermal box; the four-way valve is connected to the enrichment system, the focusing trap, the electronic pressure controller and the sample collection system through the thermal box, respectively; the focusing trap is connected to the chromatographic analytical column system through the column compartment; the focusing trap is configured to focus the target components desorbed from the enrichment system and transport the focused target components to the chromatographic analytical column system for separation; and the target components separated by the chromatographic analytical column system are transferred to the detector for detection;
the electronic control system is connected to the injection system, the column compartment, the vaporizing chamber, the chromatographic analytical column system, the detector, the electronic pressure controller, the enrichment system, the thermal box, the sample collection system, the focusing trap and an electronic switch valve box; and
the chromatographic apparatus comprises an enrichment mode, a thermal desorption mode and a back flushing mode, which are performed by means of a combination of the four-way valve and the electronic switch valve box.

In an embodiment, the four-way valve comprises a port A and a port D; the electronic switch valve box comprises a first electronic switch valve provided between the electronic pressure controller and the four-way valve, and a second electronic switch valve provided between the sample collection system and the four-way valve; the enrichment system is a trap column system which is configured to trap the target components in the vaporized sample under a first preset temperature; and the sample collection system is configured to collect and discharge background components in the vaporized sample;
the enrichment mode is performed through steps of:
after the sample is vaporized in the vaporizing chamber, communicating the port D with the port A of the four-way valve; and
closing the first electronic switch valve and opening the second electronic switch valve;
wherein the target components in the vaporized sample are trapped by the trap column system under the first preset temperature, and the background components in the vaporized sample are collected by the sample collection system and discharged.

In an embodiment, the four-way valve further comprises a port B; the thermal desorption mode is performed through steps of:
after the target components are enriched, closing the second electronic switch valve, and rotating the four-way valve to communicate the port A with the port B; and
raising a temperature of a trap column of the trap column system to perform desorption of the target components;
wherein the target components trapped by the trap column system are heated to be desorbed from the trap column system to enter the focusing trap.

In an embodiment, the four-way valve further comprises a port C; the focusing trap is a focusing chromatographic column system configured to focus the target components desorbed from the trap column system; and the back flushing mode is performed through steps of:
rotating the four-way valve to communicate the port A with the port D again and communicate the port C with the port B;
closing the second electronic switch valve and opening the first electronic switch valve;
closing a pressure of the vaporizing chamber;
raising a temperature of the focusing chromatographic column system to focus the target components desorbed from the trap column system; and
transferring the focused target components to the chromatographic analytical column system;
wherein heavy components in the sample are back flushed out; the target components separated from the chromatographic analytical column system are delivered to the detector for detection.

In an embodiment, the trap column of the trap column system is a cooling-type trap column or a heating-type trap column; the focusing chromatographic column of the focusing chromatographic column system is a cooling-type focusing chromatographic column or a heating-type focusing chromatographic column; and the trap column system and the focusing chromatographic column system both are a cooling-type capillary chromatographic column, a heating-type capillary chromatographic column or a combination, and are independently temperature controlled;
the electronic control system further comprises a chromatographic workstation and a display screen; and the injection system, the vaporizing chamber, the chromatographic analytical column system and the detector are connected to the chromatographic workstation, respectively; and
after introduced by the injection system, the sample is sequentially enriched and desorbed by the trap column system, focused by the focusing chromatographic column system, separated by the chromatographic analytical column system and detected by the detector; and detection results are displayed on the display screen by the electronic control system.

In an embodiment, models of the injection system, the vaporizing chamber, the chromatographic analytical column system and the detector are adjustable; and
the injection system is a gas sampling valve or an automatic liquid injector; and the vaporizing chamber is a split or splitless inlet for a chromatographic instrument.

In an embodiment, the sample collection system is connected to the electronic pressure controller; the sample collection system is configured to measure the sample by cooperation with the electronic pressure controller or using a precision electronic flow meter, or to perform a cumulative measurement on the sample after multiple injections.

In an embodiment, in the enrichment and thermal desorption working modes, interference of the background components is eliminated through large-volume continuous injection and repeated injection, and by separating the background components with the help of the enrichment system; and the target components trapped by the enrichment system are transferred to the focusing trap.

In an embodiment, in an analytical cycle, a switch among the enrichment, thermal desorption and back flushing working modes is performed through the combination of the four-way valve and the electronic switch valve box; and the electronic control system is configured to control the analytical cycle through a time sequence program.

In a second aspect, this disclosure also provides a method of analyzing trace and ultra-trace components using the above chromatographic apparatus, comprising:
  injecting the sample into the vaporizing chamber through the injection system;
  vaporizing the sample in the vaporizing chamber;
  trapping, by the enrichment system, the target components in the vaporized sample;
  subjecting the target components to desorption from the enrichment system followed by transferring to the focusing trap, and subjecting the enrichment system to back flushing to remove heavy components;
  focusing the target components by the focusing trap;
  subjecting the focused target components to separation through the chromatographic analytical column system; and
  detecting the target components by the detector.

In an embodiment, the four-way valve comprises a port A and a port D; the electronic switch valve box comprises a first electronic switch valve provided between the electronic pressure controller and the four-way valve, and a second electronic switch valve provided between the sample collection system and the four-way valve; the enrichment system is a trap column system which is configured to trap the target components in the vaporized sample under a first preset temperature; and the sample collection system is configured to collect and discharge background components in the vaporized sample; and
  the step of "trapping, by the enrichment system, the target components in the vaporized sample" comprises:
  communicating the port D with the port A of the four-way valve; and
  closing the first electronic switch valve and opening the second electronic switch valve to perform the trapping of the target components at the first preset temperature.

In an embodiment, the four-way valve further comprises a port B; and
  the step of "subjecting the target components to desorption from the enrichment system" comprises:
  closing the second electronic switch valve, and rotating the four-way valve to communicate the port A with the port B; and
  raising a temperature of the trap column system to desorb the target components from the trap column system.

In an embodiment, the four-way valve further comprises a port C; and the focusing trap is a focusing chromatographic column system configured to focus the target components desorbed from the trap column system; and
  the step of "subjecting the enrichment system to back flushing to remove heavy components" comprises:
  rotating the four-way valve to communicate the port A with the port D again and communicate the port C with the port B;
  closing the second electronic switch valve and opening the first electronic switch valve; and
  closing a pressure of the vaporizing chamber to perform back flushing on the enrichment system.

In an embodiment, the step of "focusing the target components by the focusing trap" comprises:
  raising a temperature of the focusing chromatographic column system to focus the target components.

Compared to the prior art, this application has the following beneficial effects.

(1) The apparatus provided herein has simple installation and assembly and excellent versatility, and thus can be applied to the analysis of trace and ultra-trace impurities in high-purity gaseous, liquid and solid samples that are suitable for GC analysis.

(2) In the analysis cycle, the entire enrichment system can independently work with respect to a chromatographic analysis system through its own electronic control system.

(3) The apparatus and method provided herein can be used for on-site automatic collection and on-site online enrichment and analysis of samples.

DETAILED DESCRIPTION OF EMBODIMENTS

The technical solutions of this disclosure will be further described in detail below with reference to the accompanying drawings and embodiments.

Figure 1:
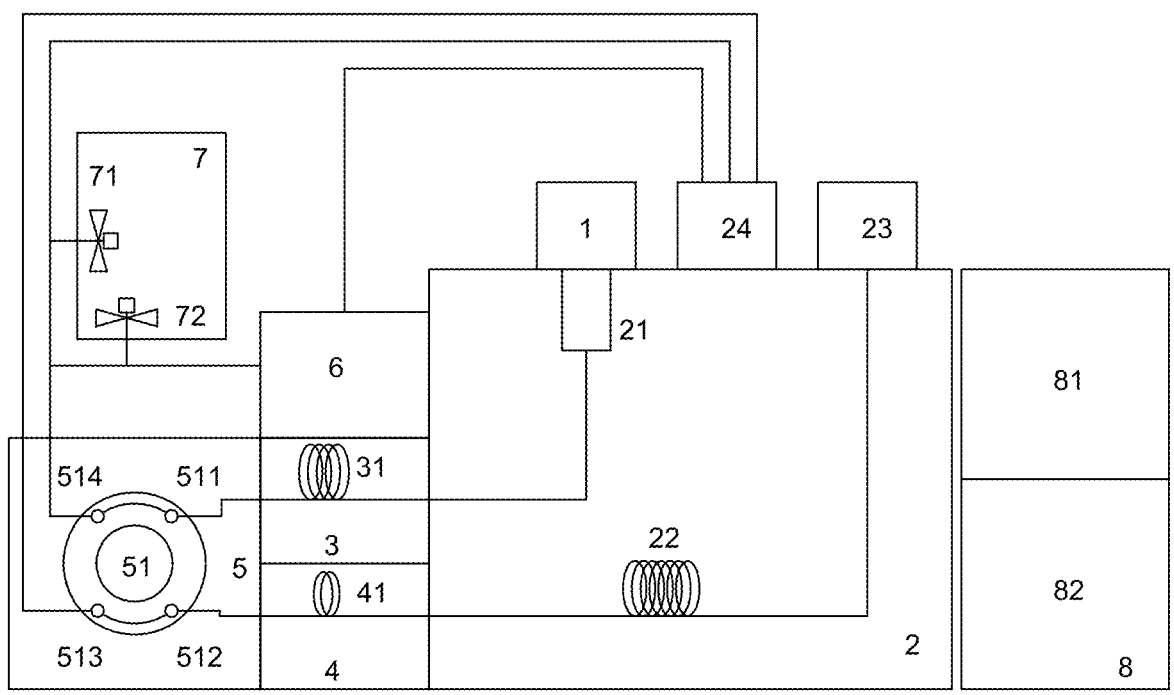
FIG. 1 schematically depicts a structure of a chromatographic apparatus for online enrichment of trace and ultra-trace components according to an embodiment of this disclosure.

As shown in FIG. 1, provided is a chromatographic apparatus for online enrichment of trace and ultra-trace components and a method for analyzing the trace and ultra-trace components using the same, including: an injection system 1, a column compartment 2, a vaporizing chamber 21, a chromatographic analytical column system 22, a detector 23, an electronic pressure controller 24, an enrichment system 3, a focusing trap 4, a thermal box 5, a sample collection system 6, a four-way valve 51, and an electronic control system 8. The injection system 1 is a gas sampling valve or an automatic liquid injector, where the gas sampling valve can be connected to a headspace sampler or a purge-trap device.

The injection system 1 is connected to the column compartment 2 through pipelines. The vaporizing chamber 21, the chromatographic analytical column system 22 and the detector 23 are connected to the column compartment 2. The chromatographic analytical column system 22 is connected to the detector 23. The detector 23 can be any commercially-available detector or a combination thereof, and the electronic pressure controller 24 is a flow controller or a pressure controller.

Specifically, in this embodiment, the vaporizing chamber 21 and the chromatographic analytical column system 22 are provided in the column compartment 2, to be controlled for the temperature during the operation. The detector 23 and the electronic pressure controller 24 are provided on the column compartment 2 and are connected to the column compartment 2.

In another embodiment, the vaporizing chamber 21, the chromatographic analytical column system 22, the detector 23 and the electronic pressure controller 24 are provided independently and are connected to the column compartment 2, which facilitates the on-site sampling for subsequent analysis.

The injection system 1 is connected to the vaporizing chamber 21 through the column compartment 2. The injection system 1 is configured to inject a sample into the vaporizing chamber 21 for vaporization. The enrichment system 3 is connected to the vaporizing chamber 21 through the column compartment 2 and is also connected to the focusing trap 4. The enrichment system 3 is configured to trap target components in a vaporized sample, and desorb and transfer the target components to the focusing trap 4. The enrichment system 3 is a trap column system 31, which is selected from any commercially-available trap columns and a combination thereof. Moreover, the trap column system 31 can be independently cooled and rapidly heated.

The four-way valve 51 is provided in the thermal box 5. The four-way valve 51 is connected to the enrichment system 3, the focusing trap 4, the electronic pressure controller 24 and the sample collection system 6 through the thermal box 5, respectively. The four-way valve 51 in the thermal box 5 can independently control for the temperature. The focusing trap 4 is connected to the chromatographic analytical column system 22 through the column compartment 2 and includes a focusing chromatographic column system 41. The focusing trap 4 is configured to focus the target components desorbed from the trap column system 31 and transport the focused target components to the chromatographic analytical column system 22 for separation. The target components separated by the chromatographic analytical column system 22 are transferred to the detector 23 for detection. The sample collection system 6 is configured to collect and discharge background components in the vaporized sample.

The sample collection system 6 is configured to measure the sample by cooperation with the electronic pressure controller 24 or using a precision electronic flow meter, or to perform a cumulative measurement on the sample after multiple injections. Specifically, the sample collection system 6 is connected to the electronic pressure controller 24. The sample collection system 6 is an insulation cavity for measuring gas injection volume, and at this time, the sample collection system 6 can be used to collect the vaporized sample and independently controlled for the temperature, so that the total amount of the sample can be measured according to the pressure change in the sample collection system 6 at a second preset temperature recorded by the electronic pressure controller 24, or using the precision electronic flowmeter, where a temperature of the sample collection system 6 is controlled at 20-350° C.

The electronic control system 8 is connected to the injection system 1, the column compartment 21, the vaporizing chamber 22, the chromatographic analytical column system 22, the detector 23, the electronic pressure controller 24, the enrichment system 3, the thermal box 5, the sample collection system 6, the focusing trap 4 and an electronic switch valve box 7 to control their working states.

The electronic control system 8 further comprises a chromatographic workstation 81 and a display screen 82. The injection system 1, the vaporizing chamber 21, the chromatographic analytical column system 22 and the detector 23 are connected to the chromatographic workstation 81, respectively. After introduced by the injection system 1, the sample is sequentially enriched and desorbed by the trap column system 31, focused by the focusing chromatographic column system 41, separated by the chromatographic analytical column system 22 and detected by the detector 23; and detection results are displayed on the display screen 82 by the electronic control system 8. Specifically, the chromatographic workstation 81 is connected to the vaporizing chamber 21, the chromatographic analytical column system 22 and the detector 23 through the column compartment 2, respectively.

The trap column of the trap column system 31 is a cooling-type trap column or a heating-type trap column. The focusing chromatographic column of the focusing chromatographic column system 41 is a cooling-type focusing chromatographic column or a heating-type focusing chromatographic column. The trap column system 31 and the focusing chromatographic column system 41 both are a cooling-type capillary chromatographic column, a heating-type capillary chromatographic column or a combination, and are independently temperature controlled. Injection structures of the injection system 1, the vaporizing chamber 21, the chromatographic analytical column system 22, the detector 23 and the chromatographic workstation 81 are respectively a gas sampling valve, an automatic liquid injector or a pressure-controlled structure.

Referring to FIG. 1, the apparatus also includes the electronic switch valve box 7. The electronic switch valve box 7 includes a first electronic switch valve 71 provided between the electronic pressure controller 24 and the four-way valve 51, and a second electronic switch valve 72 provided between the sample collection system 6 and the four-way valve 51. The first electronic switch valve 71 and the second electronic switch valve 72 are configured to perform a switch among the enrichment, desorption and back flushing working modes.

Models of the injection system 1, the vaporizing chamber 21, the chromatographic analytical column system 22 and the detector 23 are adjustable and may be any commercially-available chromatographic accessory. The injection system 1 is a gas sampling valve or an automatic liquid injector. The vaporizing chamber 21 is a split or splitless inlet for a chromatographic instrument.

The enrichment, thermal desorption and back flushing working modes can be implemented through the combination of the four-way valve 51 including a port A 511, a port B 512, a port C 513 and a port D 514, and the first electronic switch valve 71 and the second electronic switch valve 72 of the electronic switch valve box 7. The above apparatus can perform an online enrichment and analysis of purities in high-purity gas, HPLC-grade and food-grade solvents and polymer-grade monomers, such as ethylene and propylene. For gas samples, a flow can be adjusted by a vacuum pump and a pressure controller/flow meter under normal pressure to obtain the optimal enrichment effect. Moreover, under pressure, the gas sample can directly pass through the trap column of the trap column system 31, and the flow rate can be controlled through the flow meter provided after the trap column to obtain an enhanced enrichment effect. Moreover, it is also feasible to cumulatively measure the volume of multiple injections with the help of a sample loop. For liquid samples, the volume of multiple injections can be cumulatively measured using an automatic sampler. The trap column applied in the trap column system 31 can be a single chromatographic column or a combination of more chromatographic columns to ensure that all target components are trapped. Similarly, an analytical column of the chromatographic analytical column system 22 can be also a single chromatographic column or a combination of more chromatographic columns. The detector 23 should be selected in terms of the characteristics of the target components to ensure the accurate qualitative and quantitative analysis. Each analysis program has functions of back flushing the trap column and the analytical column and purging the pipeline to ensure that it is free of background interference, and the heavy components are completely removed. As validated by measurement of standards and test samples, the analytical method using the apparatus has a detection limit less than 0.1 nmol/mol, an accuracy within ±10% and a precision greater than 90%. The guide sample and practical sample are performed a measurement, where each component is less than, is less than is less than 10%. The measured contents of the target components are extremely identical to the actual contents.

The analysis method provided herein has the following three working modes.

The enrichment mode is performed as follows.

After the sample is vaporized in the vaporizing chamber 21, the port D 514 and the port A 511 of the four-way valve 51 are communicated. The first electronic switch valve 71 is closed and the second electronic switch valve 72 is opened. The target components in the vaporized sample are trapped by the trap column system 31 under the first preset temperature, and the background components in the vaporized sample are collected by the sample collection system 6 and discharged.

Regarding the thermal desorption mode, the specific steps are described as follows.

After the target components are enriched, the second electronic switch valve 72 is closed, and the four-way valve 51 is rotated to communicate the port A 511 with the port B 512. A temperature of a trap column of the trap column system 31 is raised to allow the target components to be desorbed from the trap column system 31, and then the target components are transferred to the focusing trap 4.

The back flushing mode is performed through the following steps.

The four-way valve 51 is rotated to communicate the port A 511 with the port D 514 again and communicate the port C 513 with the port B 512. The second electronic switch valve 72 is closed and the first electronic switch valve 71 is opened. A pressure of the vaporizing chamber 21 is closed. A temperature of the focusing chromatographic column system 41 is raised to focus the target components desorbed from the trap column system 31. The focused target components are transferred to the chromatographic analytical column system 22. The heavy components in the sample are back flushed out. The target components are sequentially separated by the chromatographic analytical column system 22 and detected by the detector 23.

Further, the heavy components are components in the sample that may interfere with the enrichment and analysis of the target components.

In the enrichment and thermal desorption working modes, interference of the background components is eliminated through large-volume continuous injection and repeated injection, and by separating the background components with the help of the enrichment system 3. The target components desorbed from the enrichment system 3 are transferred to the focusing trap 4 to achieve the enrichment of the trace and ultra-trace components.

In an analytical cycle, a switch among the enrichment, thermal desorption and back flushing modes is performed through the combination of the four-way valve 51 and the electronic switch valve box 7. The electronic control system 8 is configured to control the analytical cycle through a time sequence program.

The analytical method using the above apparatus will be further described with reference to the following examples.

Example 1

A high-purity hydrogen sample was analyzed herein by the above method using the chromatographic apparatus provided herein for online enrichment of trace and ultra-trace components. Specifically, conditions of enrichment, desorption and back flushing, including type and size of the trap column and the analytical column, pressure of individual pressure control points, switching time of the valve, temperature and switching time of individual temperature control points, programmed temperature rate and flow of each flow control point, were selected and optimized. The impurities in the sample were enriched and then subjected to separation and analysis, and the optimized chromatographic conditions were presented in Table 1.

TABLE 1

| Conditions of enrichment and analysis | | |
|---|---|---|
| Items | Conditions | |
| Injection mode | Continuous injection mode; post-column measurement by a flow meter Vaporizing chamber: splitless injection mode; Temperature: 200° C.; Pressure: 150 kPa | |
| Enrichment/ desorption conditions | Trap column system | Trap column 1: 5 m × 0.32 mm × 2 μm Porapak Q Metal capillary column |
| | | Trap column 2: 5 m × 0.32 mm × 2 μm Molecular sieve Metal capillary column |
| | Trapping conditions | Temperature: −50° C.; flow rate: 10 mL/min |

TABLE 1-continued

Conditions of enrichment and analysis

| Items | | Conditions |
|---|---|---|
| | Desorption conditions | Initial temperature: 50° C.; Initial time: 0 min; Temperature program: rising to 200° C. at 120° C./min; and keeping at 200° C. for 2 min; pressure: 150 kPa |
| | Conditions of back flushing | Temperature: 220° C.; Pressure: 350 kPa; 5-10 min |
| Conditions of focusing trap | Focusing chromatographic column system | 0.5 m × 0.32 mm × 2 μm Porapak Q Metal capillary column |
| | Focusing conditions | Temperature: −60° C.; Pressure: 150 kPa |
| | Rapid desorption conditions | Temperature: 220° C.; Pressure: 250 kPa |
| Analysis conditions | Chromatographic analytical column system | Analytical column: 30 m × 0.25 mm × 0.5 μm Molecular sieve Quartz capillary column |
| | Analysis conditions | Temperature   Initial temperature: 50° C.; Initial time: 2 min; Temperature program: rising to 230° C. at 5° C./min; and keeping at 230° C. for 5 min |
| | Flow rate | 0.6 mL/min |
| Switching time of valve | | Default state: position 1 (enrichment); 10 min: position 2 (desorption), 2 min: position 3 (back flushing) |
| Electronic switch valves | | First electronic switch valve 71: close (default state); 3 min, open; 5 min, close Second electronic switch valve 72: open (default state); 3 min, close; 5 min, open |
| Electronic pressure controllers/ flow meters | | First electronic pressure controller/flow meter: close (default state) Second electronic pressure controller/flow meter: open (default state); Pressure: 100 kPa Third electronic pressure controller/flow meter: open (default state); Pressure: 150 kPa |
| Detector | | Helium ionization detector PDHID: Carrier gas: high-purity helium; Temperature: 250° C. |

Figure 2:
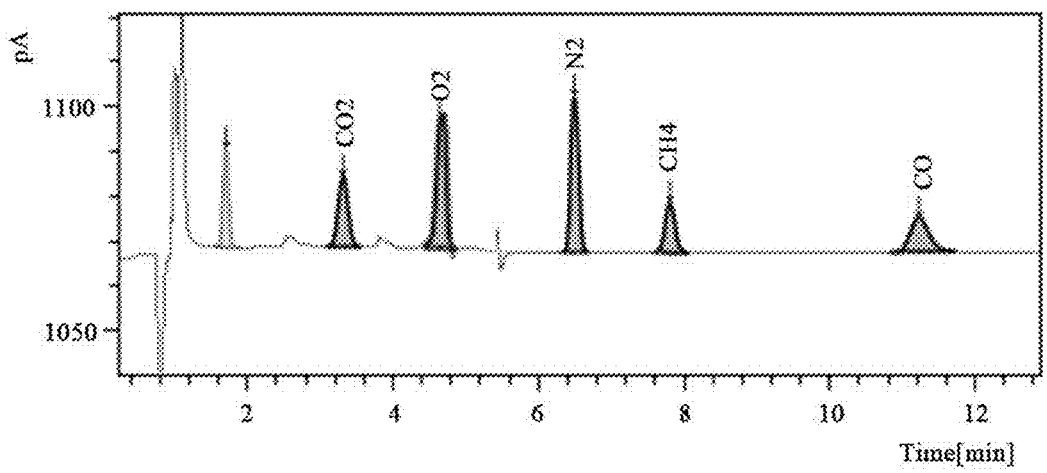
FIG. 2 is a gas chromatogram of impurities in high-purity hydrogen according to Example 1 of this disclosure.

The online enrichment and analysis method of trace and ultra-trace components using the chromatographic apparatus provided herein was evaluated for accuracy, repeatability and stability system under the optimized conditions using a reference sample 1 as calibration reference and a reference sample 2 as an analyte. The obtained gas chromatogram was presented in FIG. 2, and the data results were displayed in Table 2.

It can be seen from Table 2 that when applied to the analysis of impurities in the high-purity hydrogen sample, the method of this disclosure had a relative standard deviation (RSD, calculated by 5 consecutive tests) less than 7.1% and a recovery rate of 95.6%-120.8%, indicating that it was suitable for the analysis of trace and ultra-trace components.

Example 2

A commercially-available 1,3-butadiene product was analyzed herein by the above method using the chromatographic apparatus provided herein for online enrichment of trace and ultra-trace components. Specifically, conditions of enrichment, desorption and back flushing, including type and size of the trap column and the analytical column, pressure of individual pressure control points, switching time of the valve, temperature and switching time of individual temperature control points, programmed temperature rate and flow of each flow control point, were selected and optimized. The impurities in the sample were enriched and then subjected to separation and analysis, and the optimized chromatographic conditions were presented in Table 3.

TABLE 2

Testing results of impurities in high-purity hydrogen

| | Content, mg/m$^3$ | | | | | Average | | Recovery |
|---|---|---|---|---|---|---|---|---|
| Components | 1 | 2 | 3 | 4 | 5 | value | RSD/% | rate/% |
| $O_2$ | 0.63 | 0.67 | 0.71 | 0.58 | 0.73 | 0.66 | 7.1 | 115.2 |
| $N_2$ | 10.7 | 10.2 | 10.5 | 10.8 | 10.2 | 10.48 | 2.1 | 120.8 |
| CO | 0.043 | 0.048 | 0.044 | 0.041 | 0.037 | 0.043 | 6.8 | 100.8 |
| $CO_2$ | 0.033 | 0.032 | 0.036 | 0.032 | 0.035 | 0.034 | 4.5 | 95.6 |
| $CH_4$ | 0.059 | 0.058 | 0.065 | 0.061 | 0.059 | 0.060 | 3.4 | 98.7 |

TABLE 3

Conditions of enrichment and analysis

| Items | | Conditions |
|---|---|---|
| Injection mode | | Automatic liquid injector; multiple injections<br>Vaporizing chamber: splitless injection mode; Temperature: 300° C.; Pressure: 150 kPa |
| Enrichment/<br>desorption<br>conditions | Trap column system | Trap column 1: 5 m × 0.32 mm × 2 μm 624 Metal capillary column<br>Trap column 2: 5 m × 0.32 mm × 2 μm INNOWAX Metal capillary column |
| | Trapping conditions | Temperature: 10° C.; Flow rate: 10 mL/min |
| | Desorption conditions | Initial temperature: 50° C.; Initial time: 0 min;<br>Temperature: rising to 240° C. at 120° C./min; and keeping at 240° C. for 2 min; Pressure: 150 kPa |
| | Conditions of back flushing | Temperature: 250° C.; Pressure: 200 kPa; 5-10 min |
| Conditions of focusing trap | Focusing chromatographic column system | 0.5 m × 0.32 mm × 2 μm INNOWAX Metal capillary column |
| | Focusing conditions | Temperature: 25° C.; Pressure: 150 kPa |
| | Rapid desorption conditions | Temperature: 240° C.; Pressure: 250 kPa |
| Chromatographic analysis conditions | Chromatographic analytical column system | Analytical column: 30 m × 0.25 mm × 0.5 μm INNOWAX Quartz capillary column |
| | Analysis conditions | Temperature: Initial temperature: 50° C.; Initial time: 2 min;<br>Temperature program: rising to 240° C. at 5° C./min; and keeping at 240° C. for 5 min |
| | | Flow rate: 0.6 mL/min |
| Switching time of valve | | Default state: position 1 (enrichment); 10 min: position 2 (desorption), 2 min: position 3 (back flushing) |
| Electronic switch valves | | First electronic switch valve 71: close (default state); 2 min, open; 30 min, close<br>Second electronic switch valve 72: open (default state); 2 min, close; 30 min, open |
| Electronic pressure controllers/ flow meters | | First electronic pressure controller/flow meter: close (default state)<br>Second electronic pressure controller/flow meter: open (default state); Pressure: 100 kPa<br>Third electronic pressure controller/flow meter: open (default state); Pressure: 150 kPa |
| Detector | | Hydrogen Flame Ionization Detector FID: Carrier gas: high-purity nitrogen with a flow rate of 25 mL/min; Flammable gas: high-purity hydrogen with a flow rate of 30 mL/min; Auxiliary gas: purified air with a flow rate of 350 mL/min; Temperature: 250° C. |

Figure 3:
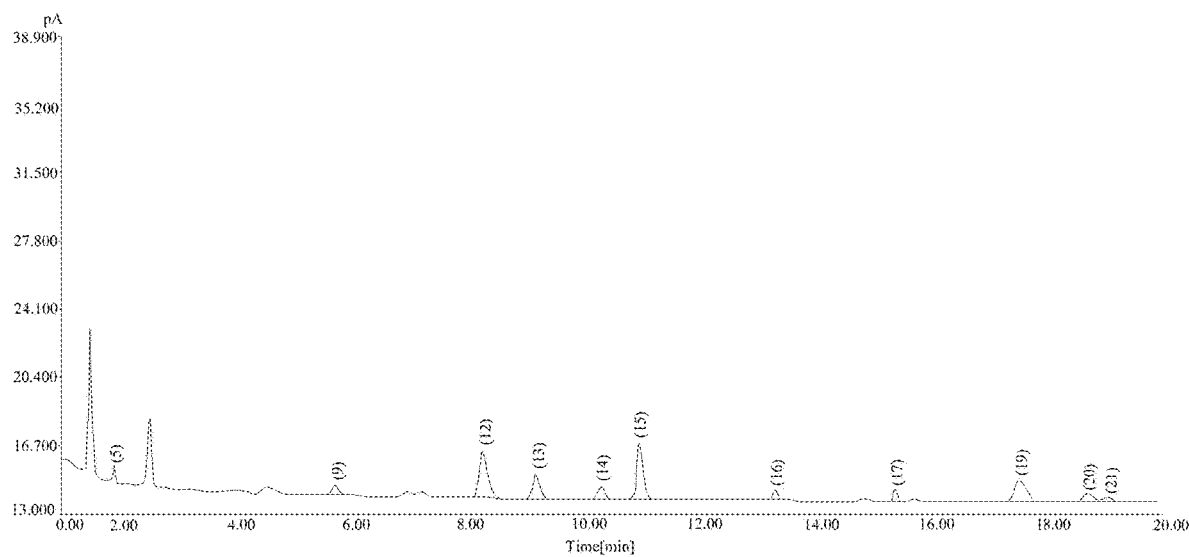
FIG. 3 is a gas chromatogram of impurities in high-purity 1,3-butadiene according to Example 2 of this disclosure, where peaks 1-11: dimethyl ether; methyl tert-butyl ether; unknown component a; unknown component b; methanol; acetone; ethanol; isopropanol; Tert-butyl/sec-butyl/iso-butyl alcohol; butanol; and unknown component c.

The online enrichment and analysis method of trace and ultra-trace components using the chromatographic apparatus provided herein was evaluated for accuracy, repeatability and stability system under the optimized conditions using 1,3-butadiene samples added with different concentrations of dimethyl ether, methyl tert-butyl ether (MTBE), methanol and Tert-/Sec-/Iso-butyl alcohol respectively as calibration reference and analyte. The obtained gas chromatogram was presented in FIG. 3, and the data results were displayed in Table 4.

It can be seen from Table 4 that when applied to the analysis of impurities in the 1,3-butadiene product, the method of this disclosure had a relative standard deviation (RSD, calculated by 5 consecutive tests) less than 8.7% and a recovery rate of 90.5%-102.3%, indicating that it was suitable for the analysis of trace and ultra-trace components.

TABLE 4

Testing results of impurities in 1,3-butadiene

| Components | Content, mg/m³ | | | | | Average value | RSD/% | Recovery rate/% |
|---|---|---|---|---|---|---|---|---|
| | 1 | 2 | 3 | 4 | 5 | | | |
| Dimethyl ether | 0.185 | 0.188 | 0.183 | 0.186 | 0.193 | 0.187 | 1.25 | 93.6 |
| Methyl tert-butyl ether (MTBE) | 1.92 | 1.81 | 1.88 | 1.89 | 1.92 | 1.90 | 1.47 | 98.3 |

TABLE 4-continued

Testing results of impurities in 1,3-butadiene

| Components | Content, mg/m³ | | | | | Average value | RSD/% | Recovery rate/% |
|---|---|---|---|---|---|---|---|---|
| | 1 | 2 | 3 | 4 | 5 | | | |
| Methanol | 0.215 | 0.226 | 0.222 | 0.225 | 0.226 | 0.224 | 1.35 | 110.5 |
| Tert-/ Sec-/ Iso-butyl alcohol | 0.211 | 0.212 | 0.206 | 0.213 | 0.215 | 0.218 | 1.33 | 107.8 |

Example 3

A commercially-available polymer-grade ethylene glycol was analyzed herein by the above method using the chromatographic apparatus provided herein for online enrichment of trace and ultra-trace components. Specifically, conditions of enrichment, desorption and back flushing, including type and size of the trap column and the analytical column, pressure of individual pressure control points, switching time of the valve, temperature and switching time of individual temperature control points, programmed temperature rate and flow of each flow control point, were selected and optimized. The impurities in the sample were enriched and then subjected to separation and analysis, and the optimized chromatographic conditions were presented in Table 5.

TABLE 5

Conditions of enrichment and analysis

| Items | | Conditions |
|---|---|---|
| Injection mode | | Automatic liquid injector; multiple injections |
| | | Vaporizing chamber: splitless injection mode; Temperature: 300° C.; Pressure: 150 kPa |
| Enrichment/ desorption conditions | Trap column system | Trap column 1: 5 m × 0.32 mm × 2 μm 624 Metal capillary column |
| | | Trap column 2: 5 m × 0.32 mm × 2 μm INNOWAX Metal capillary column |
| | Trapping conditions | Temperature: 10° C.; Flow rate: 10 mL/min |
| | Desorption conditions | Initial temperature: 50° C.; Initial time: 0 min; Temperature: rising to 240° C. at 120 C./min; and keeping at 240° C. for 2 min; Pressure: 150 kPa |
| | Conditions of back flushing | Temperature: 250° C.; Pressure: 200 kPa; 5-10 min |
| Conditions of focusing trap | Focusing chromatographic column system | 0.5 m × 0.32 mm × 2 μm INNOWAX Metal capillary column |
| | Focusing conditions | Temperature: 5° C.; Pressure: 150 kPa |
| | Rapid desorption conditions | Temperature: 240° C.; Pressure: 250 kPa |
| Chromatographic analysis conditions | Chromatographic analytical column system | Analytical column: 30 m × 0.25 mm × 0.5 μm INNOWAX Quartz capillary column |
| | Analysis conditions | Temperature |  Initial temperature: 50° C.; Initial time: 2 min; Temperature program: rising to 240° C. at 5° C./min; and keeping at 240° C. for 5 min |
| | | Flow rate      0.6 mL/min |
| Switching time of valve | | Default state: position 1 (enrichment); 10 min: position 2 (desorption), 2 min: position 3 (back flushing) |
| Electronic switch valves | | First electronic switch valve 71: close (default state); 2 min, open; 30 min, close |
| | | Second electronic switch valve 72: open (default state); 2 min, close; 30 min, open |
| Electronic pressure controllers/ flow meters | | First electronic pressure controller/flow meter: close (default state) |
| | | Second electronic pressure controller/flow meter: open (default state); Pressure: 100 kPa |
| | | Third electronic pressure controller/flow meter: open (default state); Pressure: 150 kPa |
| Detector | | Hydrogen Flame Ionization Detector FID: Carrier gas: high-purity nitrogen with a flow rate of 25 mL/min; Flammable gas: high-purity hydrogen with a flow rate of 30 mL/min; Auxiliary gas: purified air with a flow rate of 350 mL/min; Temperature: 250° C. |

Figure 4:
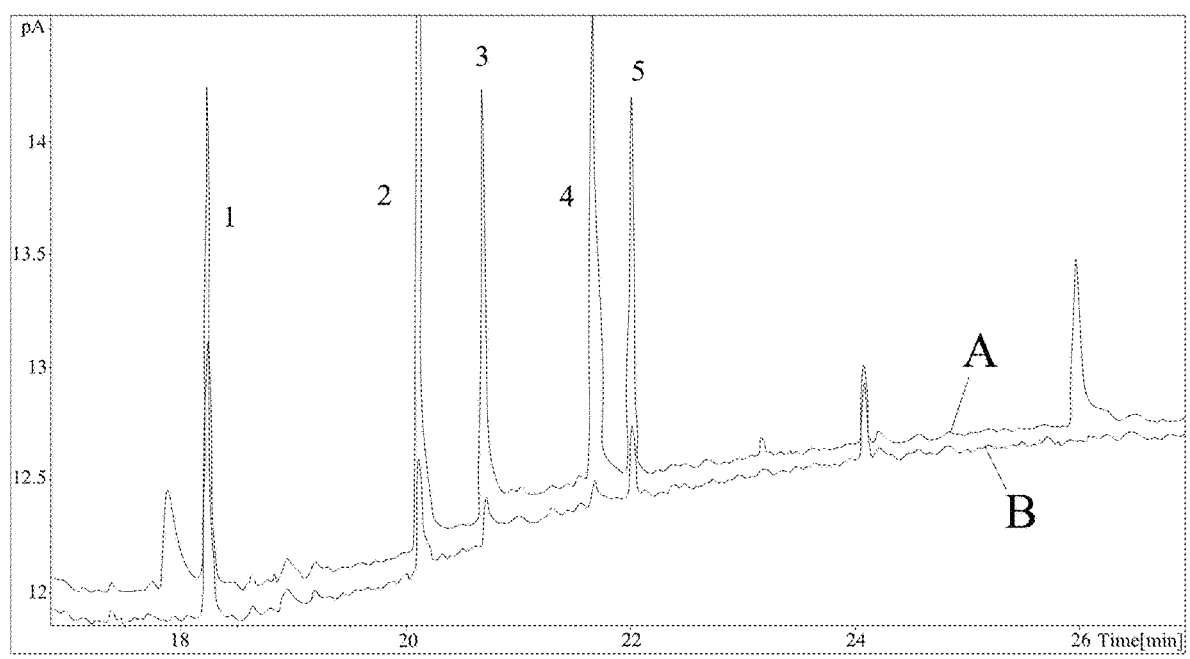
FIG. 4 is a gas chromatogram of impurities in polymerized ethylene glycol according to Example 3 of this disclosure, where curve A: 100-fold concentration; curve B: 20-fold concentration; peaks 1-5: 1,2-propanediol; 1,2-butanediol; ethylene carbonate; 1,4-butanediol; and 1,2-hexanediol.

The online enrichment and analysis method of trace and ultra-trace components using the chromatographic apparatus provided herein was evaluated for accuracy, repeatability and stability system under the optimized conditions using polymer-grade ethylene glycol samples added with different concentrations of 1,2-propanediol, 1,2-butanediol, ethylene carbonate, 1,4-butanediol and 1,2-hexanediol respectively as calibration reference and analyte. The obtained gas chromatogram was presented in FIG. 4, and the data results were displayed in Table 6.

It can be seen from Table 6 that when applied to the analysis of impurities in the ethylene glycol product, the method of this disclosure had a relative standard deviation (RSD, calculated by 5 consecutive tests) less than 8.7% and a recovery rate of 90.5%-102.3%, indicating that it was suitable for the analysis of trace and ultra-trace components.

TABLE 6

Testing results of impurities in ethylene glycol

| Components | Content, mg/kg | | | | | Average value | RSD/% | Recovery rate/% |
|---|---|---|---|---|---|---|---|---|
| | 1 | 2 | 3 | 4 | 5 | | | |
| 1,2-propanediol | 0.46 | 0.47 | 0.51 | 0.58 | 0.53 | 0.051 | 7.1 | 92.1 |
| 1,2-butanediol | 0.27 | 0.29 | 0.35 | 0.34 | 0.32 | 0.0314 | 8.7 | 98.6 |
| Ethylene carbonate | 7.9 | 8.3 | 7.5 | 8.1 | 7.7 | 0.079 | 3.0 | 102.3 |
| 1,4-butanediol | 0.36 | 0.38 | 0.34 | 0.41 | 0.33 | 0.364 | 6.8 | 99.4 |
| 1,2-hexanediol | 0.023 | 0.021 | 0.026 | 0.02 | 0.027 | 0.0234 | 8.7 | 90.5 |

Example 4

A commercially-available HPLC-grade methanol was analyzed herein by the above method using the chromatographic apparatus provided herein for online enrichment of trace and ultra-trace components. Specifically, conditions of enrichment, desorption and back flushing, including type and size of the trap column and the analytical column, pressure of individual pressure control points, switching time of the valve, temperature and switching time of individual temperature control points, programmed temperature rate and flow of each flow control point, were selected and optimized. The impurities in the sample were enriched and then subjected to separation and analysis, and the optimized chromatographic conditions were presented in Table 7.

TABLE 7

Conditions of enrichment and analysis

| Items | | Conditions |
|---|---|---|
| Injection mode | | Automatic liquid injector |
| | | Vaporizing chamber: splitless injection mode; Temperature: 200° C.; Pressure: 150 kPa |
| Enrichment/ desorption conditions | Trap column system | Trap column 1: 5 m × 0.32 mm × 2 μm HP-5 Metal capillary column |
| | | Trap column 2: 5 m × 0.32 mm × 2 μm FFAP Metal capillary column |
| | Trapping conditions | Temperature: −30° C.; Flow rate:10 mL/min |
| | Desorption conditions | Initial temperature: 50° C.; Initial time: 0 min; Temperature program: rising to 200° C. at a 120° C./min; and keeping at 200° C. for 2min; Pressure: 150 kPa |
| | Conditions of back flushing | Temperature: 220° C.; Pressure: 200 kPa; 5-10 min |
| Conditions of focusing trap | Focusing chromatographic column system | 0.5 m × 0.32 mm × 2 μm FFAP Metal capillary column |
| | Focusing conditions | Temperature: −40° C.; Pressure: 150 kPa |
| | Rapid desorption conditions | Temperature: 220° C.; Pressure: 250 kPa |
| Analysis conditions | Chromatographic analytical column system | Analytical column: 30 m × 0.25 mm × 0.5 μm Stabilwax Quartz capillary column |
| | Analysis conditions | Temperature — Initial temperature: 50° C.; Initial time: 2 min; Temperature program: rising to 230° C. at 5° C./min; and keeping at 230° C. for 5 min |
| | | Flow rate — 0.6 mL/min |

TABLE 7-continued

Conditions of enrichment and analysis

| Items | Conditions |
|---|---|
| Switching time of valve | Default state: position 1 (enrichment); 10 min: position 2 (desorption), 2 min: position 3 (back flushing) |
| Electronic switch valves | First electronic switch valve 71: close (default state); 2 min, open; 30 min, close<br>Second electronic switch valve 72: open (default state); 2 min, close; 30 min, open |
| Electronic pressure controllers/ flow meters | First electronic pressure controller/flow meter: close (default state)<br>Second electronic pressure controller/flow meter: open (default state); Pressure: 100 kPa<br>Third electronic pressure controller/flow meter: open (default state); Pressure: 150 kPa |
| Detector | Hydrogen Flame Ionization Detector FID: Carrier gas: high-purity nitrogen with a flow rate of 25 mL/min; Flammable gas: high-purity hydrogen with a flow rate of 30 mL/min; Auxiliary gas: purified air with a flow rate of 350 mL/min; Temperature: 250° C. |

Figure 5:
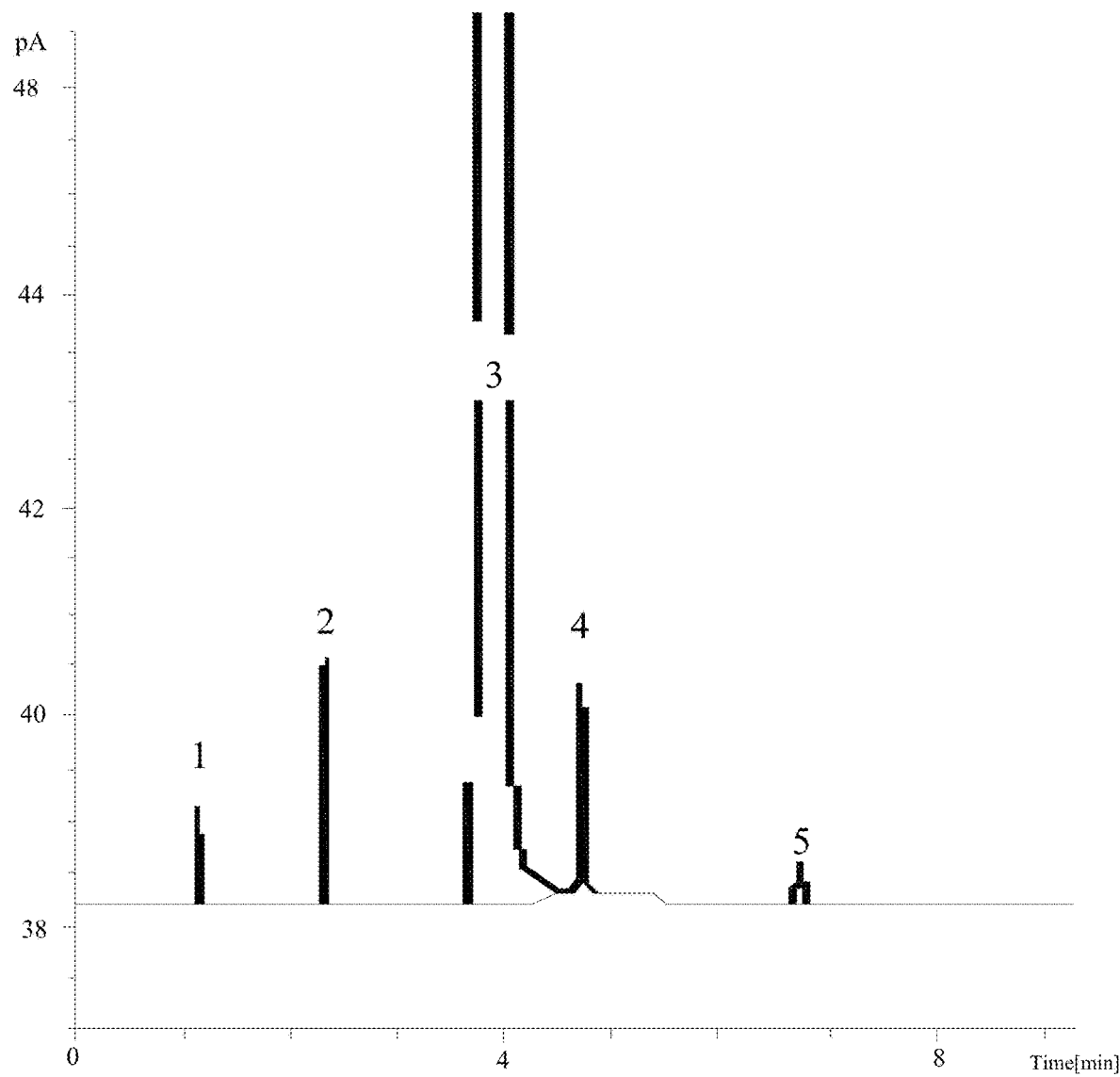
FIG. 5 is a gas chromatogram of impurities in high-purity methanol according to Example 4 of this disclosure, where peaks 1-5: dimethyl ether; methyl formate; methanol; ethanol; and acetone.

The online enrichment and analysis method of trace and ultra-trace components using the chromatographic apparatus provided herein was evaluated for accuracy, repeatability and stability system under the optimized conditions using HPLC-grade methanol samples added with different concentrations of dimethyl ether, ethanol, methyl formate and acetone respectively as calibration reference and analyte. The obtained gas chromatogram was presented in FIG. 5, and the data results were displayed in Table 8.

It can be seen from Table 8 that when applied to the analysis of impurities in the methanol product, the method of this disclosure had a relative standard deviation (RSD, calculated by 5 consecutive tests) less than 6.4% and a recovery rate of 91.3%-108.4%, indicating that it was suitable for the analysis of trace and ultra-trace components.

TABLE 8

Testing results of impurities in methanol

| Components | Content, mg/kg | | | | | Average value | RSD/% | Recovery rate/% |
|---|---|---|---|---|---|---|---|---|
| | 1 | 2 | 3 | 4 | 5 | | | |
| Dimethyl ether | 0.37 | 0.41 | 0.45 | 0.44 | 0.39 | 0.59 | 6.4 | 91.3 |
| Methyl formate | 0.211 | 0.218 | 0.206 | 0.223 | 0.235 | 0.219 | 3.8 | 103.8 |
| Ethanol | 0.52 | 0.47 | 0.54 | 0.48 | 0.53 | 0.49 | 5.2 | 108.4 |
| Acetone | 0.055 | 0.057 | 0.061 | 0.058 | 0.063 | 0.0041 | 4.4 | 94.6 |

Considering the problems in the prior art that the enrichment apparatus is complicated; there is great difficulty in seeking a selective adsorption material; the steps of extraction and desorption (thermal desorption/elution) have harsh conditions and low efficiency; the background interference cannot be eliminated; and the detection has a narrow linear range and a poor stability and repeatability, this application provides a chromatographic apparatus in which a chromatographic column/tube that can be rapidly cooled and heated is used as the enrichment system; an electronic pressure controller is provided to measure the pressure change; a precision flow meter is employed to accurately measure the total amount of samples; and a focusing chromatographic column that can be electrically cooled or cooled with low-temperature liquid is employed to re-focus the desorbed target components. In addition, the apparatus provided herein has an excellent compatibility with multiple detectors, simple assembly and desirable versatility, rendering it suitable for the enrichment and analysis of trace and ultra-trace impurities in HPLC-grade, food-grade and medical-grade solvents, high-purity gases and polymer-grade monomers. The entire enrichment system can work independently with respect to the chromatographic analysis system through its own electronic control system, so that it can be directly applied to the on-site sampling or to the on-site enrichment and analysis through coupling with a micro-chromatography.

Described above are merely preferred embodiments of this disclosure, which are not intended to limit the disclosure. It should be understood that any change, modification and replacement made by those skilled in the art without departing from the spirit of the disclosure should fall within the scope of the disclosure.

What is claimed is:

1. A chromatographic apparatus for online enrichment of trace and ultra-trace components, comprising:
    an injection system;
    a column compartment;
    a vaporizing chamber;
    a chromatographic analytical column system;
    a detector;
    an electronic pressure controller;
    an enrichment system;
    a focusing trap;
    a thermal box;
    a sample collection system;
    a four-way valve; and
    an electronic control system;
    wherein the injection system is connected to the column compartment; the vaporizing chamber, the chromatographic analytical column system and the detector are connected to the column compartment; and the chromatographic analytical column system is connected to the detector;

the injection system is connected to the vaporizing chamber through the column compartment; the injection system is configured to inject a sample into the vaporizing chamber for vaporization; the enrichment system is connected to the vaporizing chamber through the column compartment and is also connected to the focusing trap; the enrichment system is configured to trap target components in a vaporized sample, and desorb and transfer the target components to the focusing trap; the four-way valve is provided in the thermal box; the four-way valve is connected to the enrichment system, the focusing trap, the electronic pressure controller and the sample collection system through the thermal box, respectively; the focusing trap is connected to the chromatographic analytical column system through the column compartment; the focusing trap is configured to focus the target components desorbed from the enrichment system and transport the focused target components to the chromatographic analytical column system for separation; and the target components separated by the chromatographic analytical column system are transferred to the detector for detection;

the electronic control system is connected to the injection system, the column compartment, the vaporizing chamber, the chromatographic analytical column system, the detector, the electronic pressure controller, the enrichment system, the thermal box, the sample collection system, the focusing trap and an electronic switch valve box; and the chromatographic apparatus comprises an enrichment mode, a thermal desorption mode and a back flushing mode.

2. The chromatographic apparatus of claim 1, wherein the four-way valve comprises a port A and a port D; the electronic switch valve box comprises a first electronic switch valve provided between the electronic pressure controller and the four-way valve, and a second electronic switch valve provided between the sample collection system and the four-way valve; the enrichment system is a trap column system which is configured to trap the target components in the vaporized sample under a first preset temperature; and the sample collection system is configured to collect and discharge background components in the vaporized sample;

the chromatographic apparatus in the enrichment mode is configured for:

after the sample is vaporized in the vaporizing chamber, communicating the port D with the port A of the four-way valve; and closing the first electronic switch valve and opening the second electronic switch valve;

wherein the target components in the vaporized sample are trapped by the trap column system under the first preset temperature, and the background components in the vaporized sample are collected by the sample collection system and discharged.

3. The chromatographic apparatus of claim 2, wherein the four-way valve further comprises a port B; the chromatographic apparatus in the thermal desorption mode is configured for:

after the target components are enriched, closing the second electronic valve, and rotating the four-way valve to communicate the port A with the port B; and raising a temperature of a trap column of the trap column system to perform desorption of the target components;

wherein the target components trapped by the trap column system are heated to be desorbed from the trap column system to enter the focusing trap.

4. The chromatographic apparatus of claim 3, wherein the four-way valve further comprises a port C; the focusing trap is a focusing chromatographic column system configured to focus the target components desorbed from the trap column system; and the chromatographic apparatus in the back flushing mode is configured for:

rotating the four-way valve to communicate the port A with the port D again and communicate the port C with the port B;

closing the second electronic switch valve and opening the first electronic switch valve;

closing a pressure of the vaporizing chamber;

raising a temperature of the focusing chromatographic column system to focus the target components desorbed from the trap column system; and transferring the focused target components to the chromatographic analytical column system;

wherein heavy components in the sample are back flushed out; the target components are sequentially separated by the chromatographic analytical column system and detected by the detector.

5. The chromatographic apparatus of claim 4, wherein the trap column of the trap column system is a cooling-type trap column or a heating-type trap column; the focusing chromatographic column of the focusing chromatographic column system is a cooling-type focusing chromatographic column or a heating-type focusing chromatographic column; and the trap column system and the focusing chromatographic column system both are a cooling-type capillary chromatographic column, a heating-type capillary chromatographic column or a combination, and are independently temperature controlled; and the electronic control system further comprises a chromatographic workstation and a display screen; and the injection system, the vaporizing chamber, the chromatographic analytical column system and the detector are connected to the chromatographic workstation, respectively.

6. The chromatographic apparatus of claim 1, wherein models of the injection system, the vaporizing chamber, the chromatographic analytical column system and the detector are adjustable; and the injection system is a gas sampling valve or an automatic liquid injector; and the vaporizing chamber is a split or splitless inlet for a chromatographic instrument.

7. The chromatographic apparatus of claim 1, wherein the sample collection system is connected to the electronic pressure controller; the sample collection system is configured to measure the sample by cooperation with the electronic pressure controller or using a precision electronic flow meter, or to perform a cumulative measurement on the sample after multiple injections.

8. The chromatographic apparatus of claim 1, wherein in the enrichment and thermal desorption modes, interference of the background components is eliminated through large-volume continuous injection and repeated injection, and by separating the background components with the help of the enrichment system; and the target components trapped by the enrichment system are transferred to the focusing trap.

9. The chromatographic apparatus of claim 1, wherein in an analytical cycle, a switch among the enrichment, thermal desorption and back flushing modes is performed through the combination of the four-way valve and the electronic switch valve box; and the electronic control system is configured to control the analytical cycle through a time sequence program.

10. A method of analyzing trace and ultra-trace components using the chromatographic apparatus of claim 1, comprising:
injecting the sample into the vaporizing chamber through the injection system;
vaporizing the sample in the vaporizing chamber;
trapping, by the enrichment system, the target components in the vaporized sample;
subjecting the target components to desorption from the enrichment system followed by transferring to the focusing trap, and subjecting the enrichment system to back flushing to remove heavy components;
focusing the target components by the focusing trap;
subjecting the focused target components to separation through the chromatographic analytical column system; and
detecting the target components by the detector.

11. The method of claim 10, wherein the four-way valve comprises a port A and a port D; the electronic switch valve box comprises a first electronic switch valve provided between the electronic pressure controller and the four-way valve, and a second electronic switch valve provided between the sample collection system and the four-way valve; the enrichment system is a trap column system which is configured to trap the target components in the vaporized sample under a first preset temperature; and the sample collection system is configured to collect and discharge background components in the vaporized sample; and
the step of "trapping, by the enrichment system, the target components in the vaporized sample" comprises:
communicating the port D with the port A of the four-way valve; and
closing the first electronic switch valve and opening the second electronic switch valve to perform the trapping of the target components at the first preset temperature.

12. The method of claim 11, wherein the four-way valve further comprises a port B; and
the step of "subjecting the target components to desorption from the enrichment system" comprises:
closing the second electronic switch valve, and rotating the four-way valve to communicate the port A with the port B; and
raising a temperature of the trap column system to desorb the target components from the trap column system.

13. The method of claim 12, wherein the four-way valve further comprises a port C; and the focusing trap is a focusing chromatographic column system configured to focus the target components desorbed from the trap column system; and
the step of "subjecting the enrichment system to back flushing to remove heavy components" comprises:
rotating the four-way valve to communicate the port A with the port D again and communicate the port C with the port B;
closing the second electronic switch valve and opening the first electronic switch valve; and
closing a pressure of the vaporizing chamber to perform back flushing on the enrichment system.

14. The method of claim 13, wherein the step of "focusing the target components by the focusing trap" comprises:
raising a temperature of the focusing chromatographic column system to focus the target components.

* * * * *